July 31, 1934.  S. P. MORSE  1,968,218

ELECTRIC MOTOR

Filed July 15, 1932

Inventor
Shirley P. Morse,
By Rockwell & Burkholder
Attorneys

Patented July 31, 1934

1,968,218

UNITED STATES PATENT OFFICE 1,968,218

ELECTRIC MOTOR

Shirley P. Morse, East Haven, Conn., assignor to The A. C. Gilbert Company, New Haven, Conn., a corporation of Maryland Application July 15, 1932, Serial No. 622,647

3 Claims. (Cl. 172—278)

This invention relates to electric motors and more especially to alternating current induction motors of comparatively small size, suitable for use in the operation of fans, toys and the like.

An inexpensive yet efficient motor is desired for such purposes and therefore one of the objects of this invention is to provide such a motor.

Another object of this invention is to provide an induction motor wherein the magnetic gap between the pole pieces of the field core is eliminated by means of wedge members, and to construct these parts in such a manner that the wedge members may be readily assembled in operative position after the field coils are in place.

A further object of this invention is to provide an electric motor of simple construction wherein few parts are required due to utilizing some of the parts for more than one purpose.

To these and other ends, the invention consists in the novel features and combinations of parts to be hereinafter described and claimed.

Figure 1:
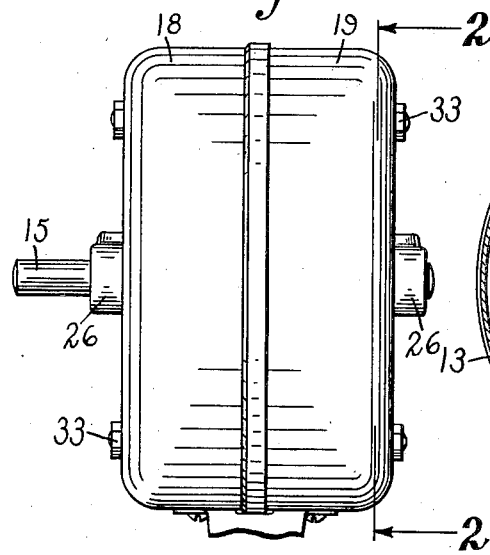
Fig. 1 is a side view of an electric motor embodying the features of this invention.

The electric motor of this invention generally comprises a laminated field core 10, having pole pieces 11 and 12, field coils 13, and a laminated rotor 14 having a shaft 15 journaled in bearing bars 16 and 17. The above parts when assembled are enclosed within and by a casing formed of two cup-shaped parts 18 and 19. The pole pieces 11 and 12 are each grooved at 20 to receive shading coils 21 which produce the necessary phase displacement for starting the motor. To decrease the magnetic gap between the pole pieces 11 and 12, members 24 and 25 are provided.

The bearing bars 16 and 17 are each provided with a shaft bearing lug 26 that extends axially outwardly from the bar and with field core engaging bosses 27 and 28 disposed one on either end of each bar and which extend inwardly toward and into engagement with the field core 10. Rods 29, each being threaded at each of its ends, pass through the bosses 27 and 28 and the field core 10. Nuts 30 threadingly engaging the ends of the rods 29 clamp the field core 10 between the bars 16 and 17 when tightened. Spacing sleeves 31 and 32 disposed upon the shaft 15, between the rotor 14 and each bearing lug 26, transversely align the rotor 14 with the pole pieces 11 and 12.

Each casing part is provided with perforations that receive the threaded ends of rods 29, and nuts 33 are used to clamp these casing parts thereto. The casing parts telescope one within the other at their opposing edges, casing part 18 being enlarged in diameter at this portion to permit this. A centralized opening in each casing part permits the respective bearing lug 26 to protrude therethrough, whereby the shaft 15 may be properly lubricated through oil holes 34 formed in each lug.

The pole pieces 11 and 12 extend toward each other from opposite sides of the field core and are arcuately recessed at their opposing ends, as at 35 and 36, respectively, so as to partially surround the rotor 14. At each of the extremes of the arcuate recess, each pole piece presents a surface 37 that is disposed on a line radially directed in respect to the axis of the rotor and the center point of the arcuate recesses 35 and 36. A lip or tongue 38 is provided on each of the pole pieces at each of the extremes of the arcuate recesses, the tongues on one pole piece being directed toward those on the other pole piece and extending beyond the radially disposed surface 37 adjacent thereto.

The members 24 and 25 are identically formed and are arc-shaped in cross-section, the radius of the arc forming the inner surface being substantially equal to the radius of the recessed portion of the pole pieces. The side edges 39 of each member are disposed substantially along a line radially disposed with respect to the axis of the rotor 14. The members 24 and 25 are of sufficient width to extend between and seat on the opposing radially directed surfaces 37 of the pole pieces and of sufficient length to extend axially across the field core. These members are of the proper thickness to present an arcuate inner surface 40, which is peripherally in line with the surface of the arcuate recesses 35 and 36, and to insure that the outer surface of each member rests against the tongues 38. After the preformed field coils 13 are placed about the respective pole pieces during the assembly of the motor, the wedge members 24 and 25 are axially pressed in place from a side of the core and will be retained therebetween due to the cooperating structure above described.

It will be obvious from the above description that the motor will be inexpensive to manufacture due to the minimum number of parts used in its construction. The structure of the field core pole pieces and the magnetic gap wedge members greatly facilitates the insertion and retention of the latter between the former after the field coils have been assembled to the pole pieces. The provision of common means for securing and locating the rotor shaft bearings and casing parts in respect to the field core, insures proper alignment of the parts and facilitates the complete assembly of the motor.

Figure 2:
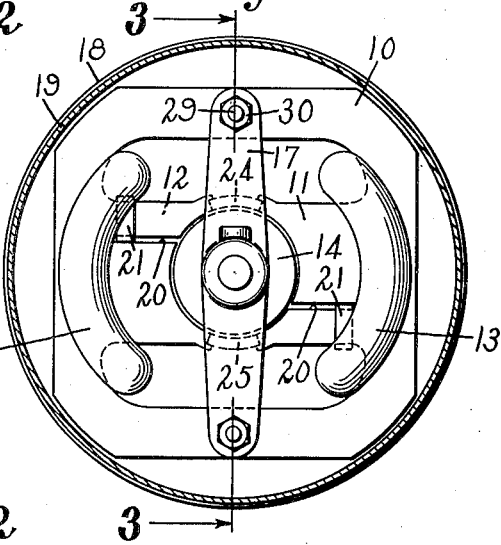
Fig. 2 is a section on line 2—2 of Fig. 1.
Figure 3:
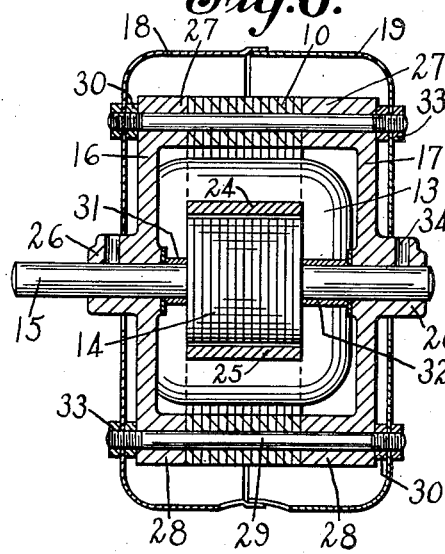
Fig. 3 is a section on line 3—3 of Fig. 2.
Figure 4:
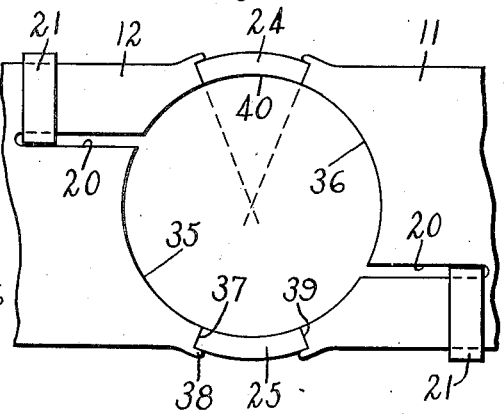
Fig. 4 is an enlarged detailed view showing the construction and arrangement of the pole pieces and the wedge members interposed therebetween.

In my improved motor construction a number of important electrical and mechanical advantages are combined. I am enabled to locate the rotor centrally with respect to the field core, and to avoid the disadvantages arising from the existence of long air gaps between corresponding ends of the pole pieces, and I can use shading coil loops that are formed in one piece, such as are produced by cutting off a small piece from the end of a tube and then squaring up such piece, and I am further enabled to place the shading coils in position on the pole pieces and the main field coils in position on the pole pieces prior to the installation of the magnetic bridge members, and prior to the placing of the rotor in position so that it is unnecessary to make the laminations in sections or to slit the laminations in order to interrupt the peripheral continuity thereof. The bridge members are of appreciable thickness so that magnetically they are effective, and nevertheless they can be very readily placed in position after the placing of the field coils and shading coils. Preferably these magnetic bridge members are in the form of relatively flat segmental arch members, as shown, having concentric inner and outer curves, and each member can be easily slid in place endwise, being prevented from displacement radially inward by the arch-shaped formation of bridge member and pole pieces, and being prevented from displacement radially outward by the tongues or equivalents which are provided on each lamination. Preferably also the laminations are provided with connecting side portions which are set relatively closely to the poles and extend in parallelism therewith, as shown in Fig. 2. This provides for a close and direct magnetic connection in the field between the poles, as the inner edges of the laminations are spaced at short distances from the side faces of the pole pieces, and substantially parallel thereto.

While I have shown and described a preferred embodiment of my invention, it is understood that the same is not to be limited to the details shown but is capable of modification and variation within the spirit of the invention and the scope of appended claims.

What I claim is:

1. In an electric motor, a field core made up of a plurality of laminations, each lamination having an open interior and provided with pole pieces projecting inwardly and having curved faces conforming to the curvature of the rotor, a rotor mounted adjacent said pole pieces, the side portions of the pole pieces being shaped to present abutments substantially radial to the rotor axis to sustain an arch-shaped bridge member interposed between opposing abutments, bridge members slid lengthwise into position between the pole pieces and each having an arc-shaped inner surface concentric with the rotor, an arc-shaped outer surface concentric with the rotor and side faces disposed on lines radial to the rotor axis and engaging said radial abutments, said bridge members being of substantially uniform thickness throughout their width, and means integral with the pole pieces engaging the arch-shaped bridge members at the sides thereof to prevent outward radial displacement of said bridge members.

2. In an electric motor, a field core made up of a plurality of laminations, each lamination having an open interior provided with oppositely located pole pieces projecting toward each other and having opposing curved faces conforming to the curvature of the rotor, a rotor mounted between said pole pieces, the side portions of the pole pieces being shaped to present abutments substantially radial to the rotor axis to sustain arch-shaped bridge members interposed between said pole pieces at the sides of the rotor, bridge members slid lengthwise into position between the pole pieces and each having inner and outer curved surfaces concentric with the rotor and side faces disposed on lines radial to the rotor axis and engaging said radial abutments, said bridge members being of appreciable thickness and of uniform thickness from side to side, and tongues on the pole pieces at the outer parts thereof overhanging the bridge members at the respective ends and adapted to prevent outward radial displacement of said bridge members.

3. In an electric motor, a field core made up of a plurality of laminations, each lamination having an open interior and provided with pole pieces projecting inwardly and having curved faces conforming to the curvature of the rotor, a rotor mounted adjacent said pole pieces, the side portions of two adjacent pole pieces being shaped to present abutments substantially radial to the rotor axis, bridge members of appreciable thickness slid lengthwise into position between said pole pieces and having inner and outer surfaces concentric to the rotor axis and side faces radially disposed with reference to the rotor axis and engaging said radial abutments, and tongues on said pole pieces formed integrally therewith and associated with said radial abutments and located farther from the rotor axis than said radial abutments and projecting toward each other and beyond said radial abutments so as to overhang the bridge members at the outer portions thereof and by engaging the outer surfaces of said bridge members prevent the outward displacement of said bridge members.

SHIRLEY P. MORSE.